(12) United States Patent
Campbell

(10) Patent No.: US 10,161,500 B2
(45) Date of Patent: Dec. 25, 2018

(54) OIL PUMP PLATE FOR IN-LINE FILTER SYSTEM

(71) Applicant: AMARILLO GEAR COMPANY LLC, Amarillo, TX (US)

(72) Inventor: John S. Campbell, Chicago, IL (US)

(73) Assignee: AMARILLO GEAR COMPANY LLC, Amarillo, TX (US)

( * ) Notice: Subject to any disclaimer, the term of this patent is extended or adjusted under 35 U.S.C. 154(b) by 746 days.

(21) Appl. No.: 14/674,817

(22) Filed: Mar. 31, 2015

(65) Prior Publication Data

US 2016/0290481 A1  Oct. 6, 2016

(51) Int. Cl.
| | |
|---|---|
| *F16H 57/04* | (2010.01) |
| *F16H 57/02* | (2012.01) |
| *F16H 57/00* | (2012.01) |
| *F01M 11/03* | (2006.01) |
| *B01D 35/027* | (2006.01) |

(52) U.S. Cl.
CPC ......... *F16H 57/0436* (2013.01); *F01M 11/03* (2013.01); *F16H 57/02* (2013.01); *F16H 57/0404* (2013.01); *F16H 57/045* (2013.01); *B01D 35/027* (2013.01); *B01D 2201/265* (2013.01); *F01M 2011/035* (2013.01); *F01M 2011/036* (2013.01); *F16H 2057/005* (2013.01)

(58) Field of Classification Search
None
See application file for complete search history.

(56) References Cited

U.S. PATENT DOCUMENTS

| | | | | |
|---|---|---|---|---|
| 2,691,429 | A * | 10/1954 | Kovacs | B01D 35/306 184/6.24 |
| 4,052,307 | A | 10/1977 | Humbert, Jr. | |
| 4,406,784 | A | 9/1983 | Cochran | |
| 4,492,632 | A | 1/1985 | Mattson | |
| 4,834,040 | A * | 5/1989 | Yoshida | F02B 67/00 123/196 R |
| 5,546,999 | A | 8/1996 | Parker | |
| 5,771,854 | A * | 6/1998 | Barton | F01M 1/02 123/196 R |
| 6,245,232 | B1 | 6/2001 | Craft | |
| 6,790,348 | B2 | 9/2004 | Orborn | |
| 7,300,581 | B2 | 11/2007 | Seipold | |
| 8,181,745 | B1 | 5/2012 | Stanfield et al. | |
| 8,807,111 | B2 * | 8/2014 | Hughes | F02M 39/00 123/196 A |

OTHER PUBLICATIONS

Amarillo Gear Company LLC, "Right Angle Gear Drives," Catalog CT (copyright date 2014).
Amarillo Gear Company LLC, "Parallel Shaft Gear Drives for Dry Cooling Systems and Steam Condensers," Catalog PS (copyright date 2014).

* cited by examiner

*Primary Examiner* — Benjamin M Kurtz
(74) *Attorney, Agent, or Firm* — Marshall, Gerstein & Borun LLP

(57) ABSTRACT

An oil pump plate for operatively coupling an oil pump within a gearbox casing is provided, which allows installing and/or uninstalling an in-line filter for the oil pump without having to modify the gearbox casing.

13 Claims, 3 Drawing Sheets

OIL PUMP PLATE FOR IN-LINE FILTER SYSTEM

FIELD OF THE DISCLOSURE

The present disclosure is related generally to a plate for an oil pump that provides for field alterable plumbing relative to the oil pump.

BACKGROUND

In facilities where industrial gearboxes are used, equipment is often initially installed with only a minimum set of features to adhere to the basic purposes. As such, a machine is often installed without many additional accessories, some of which may enhance the life, functionality, and/or reliability of the machine. One such exemplary machine is a gear drive, such as for a dry cooling system and/or a steam condenser, in which the gear drive includes a primary oil pump for circulating oil along a primary oil circulation system to various locations of a gear box in order to lubricate portions of the gear drive. Frequently, it is desired to have an oil filter installed as part of the oil circulation system. Such oil filters may be provided as an in-line filter system or as an off-line filter system.

An off-line filter system is connected to a supply of the oil in a manner that is not directly disposed along the primary oil circulation system. Such a system frequently includes a secondary oil circulation system connected to the supply of oil and along which a filter and a secondary oil pump are operatively disposed. The oil filter and the secondary oil pump are normally located outside of the main gear box and connected to the oil supply by lines that extend through an outer casing of the gear box. Thus, an off-line filter may be operated independently from operation of the primary oil circulation system. An advantage of such an off-line system is that it may allow the oil filter to be active even if the primary oil circulation system is not active. In addition, it may provide for relatively easy modification and/or servicing of the oil filter. Another advantage of such an off-line filter system is that it may be easily retrofitted to, i.e., added to, a gear box that was not originally outfitted with (or requires an additional) oil filter. However, the requirement of a secondary oil pump may increase cost and/or servicing requirements.

In contrast, an in-line filter system is operatively disposed along the flow path of the primary oil circulation system. As oil is pumped by the primary oil pump, the oil is filtered as part of the primary oil circulation system driven by the primary oil pump. Thus, an in-line filter is active whenever the primary oil pump is operating. An advantage of an in-line system is that it often provides a more compact and/or easier to install gear drive. Another advantage of an in-line system is that a secondary oil pump is not required. However, adding and/or servicing the filter of such an in-line system in the field, in particular when arranged as part of a gear drive for a dry cooling system and/or a steam condenser without an originally installed filter, can be highly labor intensive and/or cost prohibitive.

SUMMARY

In an aspect of the invention, an oil pump plate for operatively coupling an oil pump within a casing, such as a gearbox casing is provided. The oil pump plate in some arrangements may allow installing and/or uninstalling an in-line filter for the oil pump without having to modify the gearbox casing. In another aspect of the invention, an oil pump assembly includes an oil pump operatively connected with the oil pump plate. In another aspect of the invention, a gearbox assembly includes an oil pump that is operatively coupled to a gearbox rotating component, such as a gear shaft or drive shaft, and the oil pump plate.

The oil pump plate, in one arrangement, includes a first port for operative connection to the oil pump, a second port for operative connection with an oil containing cavity of the casing, such as an oil galley of the gearbox, and a first conduit extending from the first port to the second port. A filter outlet port is operatively connected with the first conduit at a first location along the first conduit. A filter inlet port is operatively connected with the first conduit at a second location along the first conduit. The filter inlet port and the filter outlet port are arranged to be operatively coupled to an oil filter such that oil can be operatively routed from the filter outlet port to the filter and from the filter to the filter inlet port. A plug seat is disposed in the first conduit between the first location and the second location. The plug seat is adapted to receive and releasably hold a diverter plug such that the diverter plug may be selectively coupled to and/or decoupled from the plug seat, such as with a threaded connection, bayonet connection, snap-fit connection, friction fit connection, or other similar releasable connection. The first conduit is arranged such that the diverter plug is inserted into the plug seat through the first conduit and removed from the plug seat through the first conduit. Preferably, when the diverter plug is seated at the plug seat, the diverter plug closes the first conduit, such as by forming an oil-tight seal, and prevents direct fluid flow along the first conduit between the first location and the second location, thereby forcing fluid to divert through one or both of the filter inlet port and the filter outlet port. When the first conduit is not closed by the diverter plug, direct fluid flow along the first conduit between the first port and the second port is allowed. The oil pump plate is preferably formed as a single unitary body, such as by casting and or machining a single unitary part.

A plug access port may be provided that allows the diverter plug to be inserted into and removed from the plug seat. The plug access port is sized and arranged to allow the diverter plug to be inserted into and/or removed from the first conduit and engaged or disengaged from the plug seat. The plug access port may be disposed at an end of the first conduit. The second port may be operatively connected with the first conduit between the plug seat and the plug access port. In some arrangements, the first conduit extends straight (i.e., along a linear axis) from the plug access port to the plug seat. The first conduit may have a first cross-sectional size between the plug access port and the plug seat that is complimentary to and larger than a corresponding cross-sectional size of the diverter plug such that the diverter plug fits within and can be moved along the first conduit from the plug access port to the plug seat. The plug seat may have a second cross-sectional size smaller than the first cross-sectional size such that the plug seat can lockingly engage the diverter plug. In some arrangements, the plug access port may be omitted, and the diverter plug may be inserted and/or removed from the first conduit via one or both of the first port and the second port.

In some arrangements, the first conduit may have a cylindrical shape. The first cross-sectional size may be a first diameter. The first conduit may have the first diameter extending from the plug access port (or the first or second port through which the diverter plug is to be inserted and/or removed) to the plug seat. The second cross-sectional size may be a second diameter. The second diameter at the plug seat may be smaller than the first diameter. The plug seat may take the form of an internal thread having an inside diameter that is smaller than the inside diameter of the first diameter. The plug seat may form a stepped transition in the first conduit. The diverter plug may have an external thread that threadedly engages the internal thread of the plug seat. However, in other arrangements, the cross-sectional shapes of the first conduit and/or the diverter plug may be non-circular, such as rectangular, oval, or some other shape. Further, other shapes and types of complementary diverter plugs and plug seats may be used, so long as the diverter plug can be selectively attached and/or removed from the plug seat to close or open the first conduit with access via the first conduit.

Each of the first location and the second location may be located disposed along the first conduit between the first port and the second port. The first location may be spaced apart from the second location. A filter outlet conduit may extend from the first conduit at the first location to the filter outlet port. A filter inlet conduit may extend from the first conduit at the second location to the filter inlet port. In some arrangements, one or both of the filter outlet conduit and the filter inlet conduit may be omitted and the corresponding filter inlet port or filter outlet port may be disposed directly at the first conduit. The filter inlet port and/or the filter outlet port may include a coupling mechanism, such as an internal thread, for operatively coupling to the oil filter, either directly or via one or more intermediate conduits. Other coupling mechanism for retaining a plug for the ports may be used, such as any of the releasable connections described herein.

One or more of the filter inlet port, the filter outlet port, and the plug access port may be selectively sealable. In some arrangements, one or more of the filter inlet port, the filter outlet port, and the plug access port may be selectively sealed with a plug. Optionally, a sealed port may also be selectively unsealed. In one arrangement, an internal thread is disposed at the respective port, and a sealing plug is threadedly engagable with the internal thread to selectively seal the port. If it is desired to unseal a port, the respective sealing plug is unthreaded from the port to re-open that port. Other arrangements for sealing and unsealing the filter inlet port, the filter outlet port, and the plug access port also may be used.

In some arrangements, the oil pump plate has a face side, which mounts against the gearbox casing to form a sealed connection to the gearbox casing. The face side may have a mounting face adapted to mount against a corresponding mating face of the gearbox. The mounting face may be planar or non-planar, and preferably has a shape corresponding to the shape of the mating face on the gearbox. One or more seals may be disposed between the mounting face and the gearbox casing to improve the sealed connection. The first port may be disposed on the face side. The second port may be disposed on the face side. The first port may be spaced apart from the second port.

A pump receiver for receiving the oil pump may be disposed on the face side. The pump receiver may be in the form of a pad shaped and sized such that the oil pump may rest operatively on the receiver. The pump receiver may be disposed on top of a pedestal projecting upwardly from the mounting face. The receiver may include a coupling, such as a pin, to releasably couple the oil pump to the pump receiver, or the pump receiver may receive the oil pump without releasably coupling thereto. The first port may be disposed at the pump receiver to operatively connect with the oil pump such that the oil pump can pump oil into the first conduit through the first port. However, other arrangements for operatively connecting the oil pump plate to the oil pump are also possible.

The oil pump plate may include a reservoir for collecting oil and/or other fluids. The reservoir may be disposed on the face side. The oil reservoir may be disposed adjacent to the pump receiver. In one arrangement, the reservoir includes a peripheral wall extending upwardly from the face side of the oil pump plate and surrounding and spaced apart from the pedestal to form a groove at least partially surrounding the pedestal. A pump inlet may be defined in the pedestal to allow oil to pass from the reservoir to the oil pump. The reservoir may take other shapes and forms sufficient to collect oil for supply to the oil pump. Preferably, the reservoir is arranged on the oil pump plate to collect oil that drains down along a bottom or interior floor of the gearbox casing when the oil pump plate is operatively coupled to the gearbox.

The oil pump plate may include a collector for collecting water and/or sediment from the oil. The collector may be in the form of a bottom portion of the reservoir, wherein the pump inlet is spaced above a bottom surface of the reservoir such that sediment may collect in the bottom of the reservoir. However, the collector need not be formed by or be part of the reservoir but may be formed as a separate empty volume in the oil pump plate. A collector drain may be disposed in the collector to allow the reservoir to be drained without removing the oil pump plate from the gearbox casing. In some arrangements, the collector drain includes a drain hole that extends from a bottom surface of the reservoir to an exterior side of the oil pump plate. Preferably, the drain also includes a drain plug that can be selectively inserted and removed from the drain hole. One exemplary drain may include a threaded drain hole and a threaded drain plug, which can be selectively threaded into and/or out of the threaded drain hole. Other types of drains may be provided.

The filter inlet port and/or the filter outlet port and/or the access port may be disposed on one or more other exterior surfaces of the oil pump plate, which are on an exterior side of the oil pump plate, which is exposed when the face side is operatively mounted against the gearbox casing. Preferably, each of the filter inlet port, the filter outlet port, and the plug access port is disposed on an exterior surface of the oil pump plate to provide access thereto when the oil pump plate is operatively mounted to the gearbox casing.

The oil pump plate may be releasably fastenable to the gearbox casing. In some arrangements, the oil pump plate includes a fastening mechanisms for removably coupling the oil pump plate to the gearbox casing. The fastening mechanism may couple the mounting face of the oil pump plate to a complementary mating face of the gearbox casing. The fastening mechanisms may include bolt holes through the oil pump plate for receiving bolts or other fasteners to fasten the oil pump plate to the gearbox casing. The oil pump plate may include a flange that defines the mounting face, and one or more of the bolt holes may extend through the flange. The flange may partially or completely surround the receiver. The flange may partially or fully surround the reservoir. Other types of fastening mechanism may be used to releasably fasten the oil pump plate to the gearbox casing.

In another exemplary arrangement, a gearbox assembly includes an oil pump that is operatively coupled to a gearbox casing with an oil pump plate in accordance with one or more of the aspects of the disclosure, which may allow installing and/or uninstalling an in-line filter for the oil pump without opening the gearbox casing. The oil pump is disposed inside the gearbox casing, the first port is operatively connected with the oil pump, and the second port is operatively connected with the oil galley or other oil reservoir of the gearbox. The filter outlet port and the filter inlet port are preferably disposed on an exterior side of the gearbox casing in the operative position. An in-line oil filter may be selectively coupled to and/or removed from the filter inlet port and the filter outlet port from an exterior side of the gearbox casing. Optionally, the plug access port may be opened and closed from the exterior side of the gearbox, and the diverter plug may be inserted into the first conduit and operatively coupled to the plug seat from the exterior side of the gearbox.

In some arrangements, the gearbox is part of a fan drive for dry cooling systems and/or steam condensers. The fan drive may be a parallel shaft gear drive. The fan drive may be a right angle gear drive. The fan drive may be a single reduction or a multiple reduction fan drive, e.g., double reduction, triple reduction, etc. However, the oil pump plate and the gearbox are not limited to use with a fan drive, but rather may be part of and/or used with other types of machinery.

In a further aspect of the invention, a method of operatively coupling and/or decoupling an in-line filter with an oil pump in a gearbox using an oil pump plate in accordance with one or more aspects of the invention is provided. The method in some arrangements allows installing and/or uninstalling the in-line filter for the oil pump without opening the gearbox casing.

In some arrangements, an in-line oil filter may be retrofitted to a gearbox with an oil pump that is coupled to the gearbox casing with an oil pump plate as described herein according to the following steps: opening the plug access port; inserting a diverter plug into the first conduit through the plug access port; moving the diverter plug along the first conduit to the plug seat; securing the diverter plug to the plug seat; operatively coupling an oil filter to the filter outlet port and the filter inlet port such that fluid may flow from the filter outlet port to the filter and from the filter to the filter inlet port; and, closing the plug access port.

In some arrangements, an in-line oil filter may be removed from a gearbox with an oil pump that is coupled to the gearbox casing with an oil pump plate as described herein according to the following steps: operatively uncoupling the oil filter from the filter outlet port and the filter inlet port; opening the plug access port; removing the diverter plug from the plug seat; moving the diverter plug along the first conduit from the plug seat to the plug access port; removing the diverter plug from the first conduit through the plug access port; closing the plug access port after the diverter plug has been removed from the first conduit; and closing the filter outlet port and the filter inlet port.

The steps of opening and closing the filter inlet port, the filter outlet port, and the plug access port, may include screwing and/or unscrewing a diverter plug into the respective port.

The step of securing and or un-securing the diverter plug with the plug seat may include screwing and/or unscrewing the diverter plug into the plug seat.

Additional aspects and arrangements in accordance with the invention as defined variously in the claims appended hereto will be evident upon study of the drawings and the following descriptions thereof.

DETAILED DESCRIPTION OF THE DRAWINGS

Figure 1:
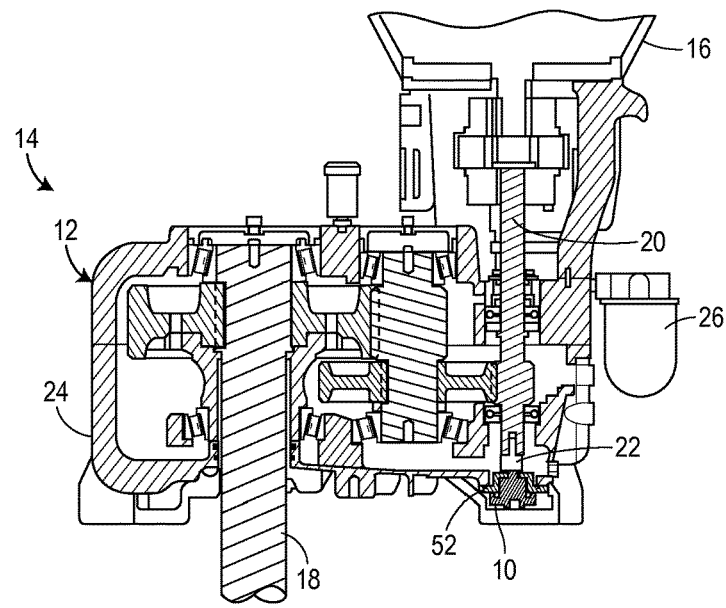
FIG. 1 is a cross-sectional view of a fan drive with an oil pump plate of the present invention operatively installed thereon.

Turning now to the drawings, FIG. 1 illustrates an oil pump assembly, including an oil pump plate 10, operatively disposed on a gearbox assembly 12 in accordance with various aspects of the present invention. In this exemplary arrangement, the gearbox assembly 12 is part of a fan drive 14 for driving a fan (not shown) operatively coupled to an output shaft 18. The fan drive 14 may be, for example, for a dry cooling system and/or a steam condenser. The gearbox assembly 12 of this example includes a parallel shaft gear drive having an input shaft 20 operatively coupled to and driven by a motor 16 mounted on mounts, and the output shaft 18, and a gear arrangement, including one or more gears, operatively disposed within a gearbox casing 24 to transfer rotational drive of the input shaft 20 to rotational drive of the output shaft 18 in any manner understood in the art. An oil pump 22 is driven by the input shaft 20. The oil pump 22 of this example is for pumping lubricating oil to remote locations of the gearbox casing 24 to lubricate the gears and other moving parts of the gear drive. However, the oil pump plate 10 is not limited to use with the fan drive 14 of the present example, but rather may be used with and/or for other applications and machines for which an oil pump and an oil filter may be needed.

Figure 2:
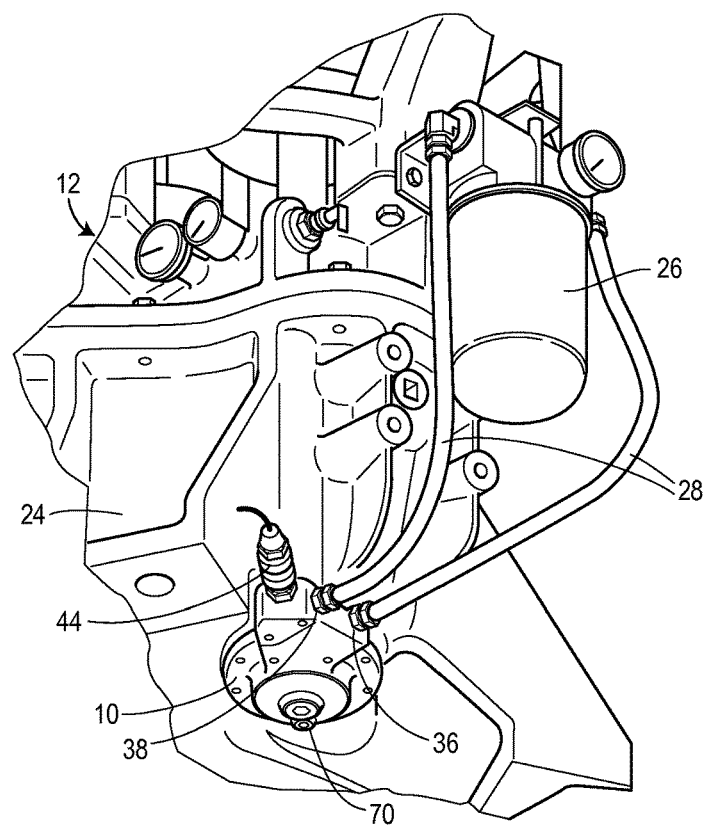
FIG. 2 is an enlarged partial exterior perspective view of the fan drive of FIG. 1 showing a gearbox of the fan drive with the oil pump plate operatively installed thereon.

FIG. 2 illustrates the oil pump plate 10 operatively installed to the gearbox casing 24, as seen from the exterior side of the gearbox casing. In this arrangement, an oil filter 26 is operatively connected with the oil pump plate 10 in an in-line configuration (i.e., the oil filter 26 forms an in-line filter) by conduits, such as inlet and outlet hoses 28. The oil filter 26 is disposed on the exterior side of the gearbox casing 24 and can be selectively connected or disconnected from the oil pump plate 10 without having to open the gearbox casing 24 or remove the oil pump plate 10 from the gearbox casing. Further, the oil pump plate 10 can be selectively modified either to be connected with the oil filter 26 in an in-line configuration or to be disconnected from the oil filter 26 without having to either remove the oil pump plate 10 from the gearbox casing 24 or otherwise have to open up the gearbox assembly 12. Thus, the oil pump plate 10 allows the gearbox assembly 12 to be easily retrofitted with an in-line oil filter, such as the oil filter 26 connected by the hoses 28, while the gearbox assembly 12 is operatively installed in the field for use with a specific piece of equipment, such as the fan drive 14 installed with a dry cooling system or a steam condenser.

Figure 3:
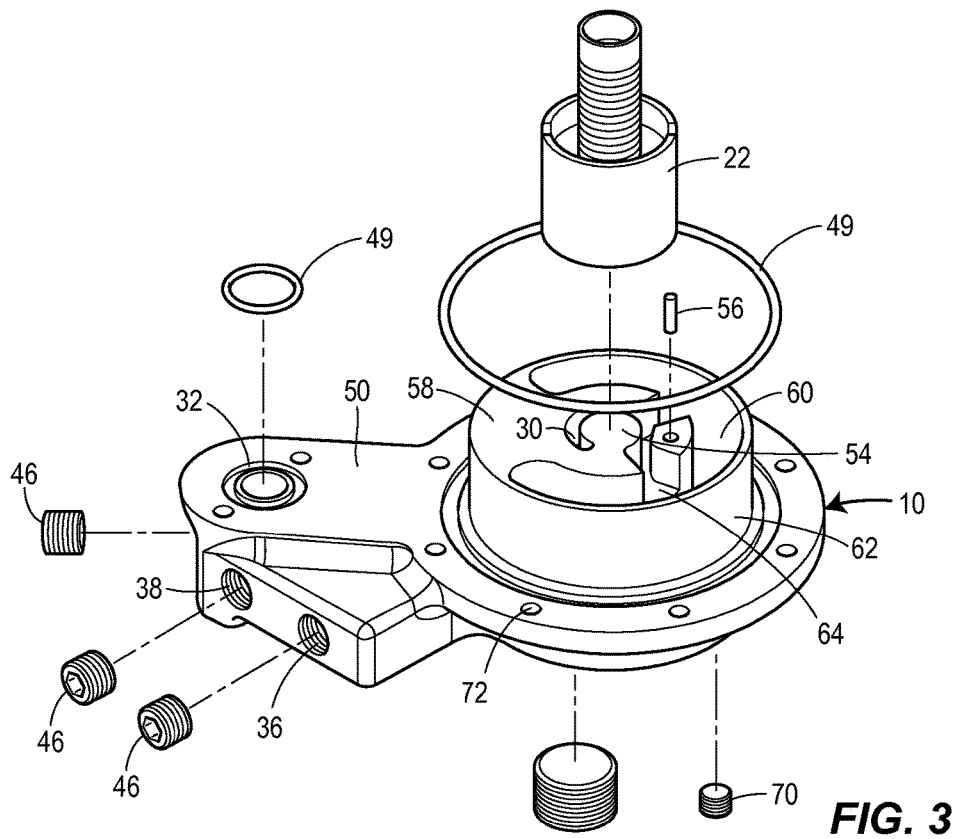
FIG. 3 is an exploded perspective view of an oil pump assembly with the oil pump and the oil pump plate of FIG. 1.
Figure 4:
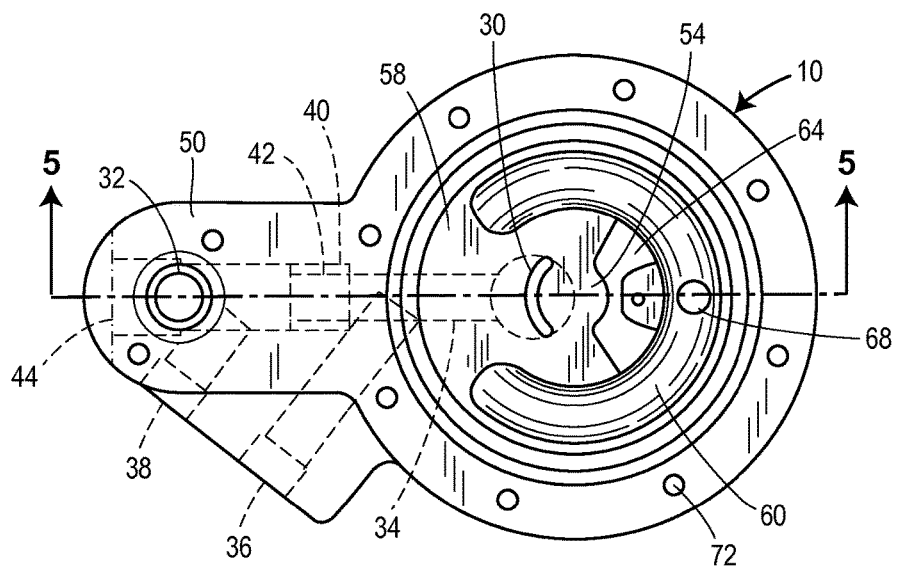
FIG. 4 is a top plan view of the oil pump plate of FIG. 3.

Turning now to FIGS. 3-6, an exemplary arrangement of the oil pump plate 10 is shown separate from a particular piece of machinery. FIG. 3 shows an oil pump assembly, including the oil pump plate 10 and the oil pump 22, in an exploded arrangement. The oil pump plate 10 is configured for operatively coupling to the oil pump 22 within a housing, such as the gearbox casing 24 of the gearbox assembly 12, in such a manner so as to allow the installation and/or removal of an in-line filter, such as the oil filter 26, for the oil pump 22 without having to modify the housing.

The oil pump plate 10 includes a first port 30 for operative connection to the oil pump 22, a second port 32 for operative connection with an oil galley or other oil reservoir of the gearbox assembly 12, and a first conduit 34 (see FIGS. 4-6) that operatively connects the first port 30 to the second port 32 to provide fluid flow therebetween. A filter outlet port 36 is operatively connected with the first conduit 34 at a first location 36b along the first conduit, for example by a filter outlet conduit 36a. A filter inlet port 38 is operatively connected with the first conduit 34 at a second location 38b along the first conduit, for example by a filter inlet conduit 38a. The first location 36b is spaced apart from the second location 38b along the first conduit 34. In the depicted arrangement, the first location 36b is spaced from the second location 38b along a central flow axis of the first conduit 34. The central flow axis is preferably a linear longitudinal axis as depicted in the drawings. It is noted that the filter inlet conduit 38a and/or the filter outlet conduit 36a may not be necessary depending upon the shape of the first conduit 34 and the body of the oil pump plate 10 if the filter inlet port 38 and/or the filter outlet port 36 can be disposed directly along the length of the first conduit 34. Each of the filter inlet port 38 and the filter outlet port 36 is arranged to be operatively coupled to an oil filter, such as the oil filter 26 via the hoses 28, such that oil can be operatively routed from the oil outlet port 36 to the filter 26, and from the filter 26 to the oil inlet port 38.

A plug seat 40 is disposed in the first conduit 34 between the first location 36b and the second location 38b. The plug seat 40 is adapted to receive and releasably hold a diverter plug 42 (see FIG. 4). In this arrangement, the plug seat 40 is in the form of an internal thread disposed on an interior wall surface of the first conduit 34, and the diverter plug 42 is in the form of a cylindrical member with exterior threads adapted to threadedly mate with the interior threads of the plug seat 40. However, other forms of a diverter plug and plug seat may be used that allow for the diverter plug 42 to be selectively engaged and/or disengaged from the plug seat 40 through the first conduit 34 so as to substantially prevent fluid flow along the first conduit 34 between the filter outlet port 36 and the filter inlet port 38. For example, in some embodiments, the plug 42 could include a rubber plug that expands radially under axial compression, or some other structure suitable to close off and seal the first conduit 34 at the desired location. When the diverter plug 42 is seated at the plug seat 40, the diverter plug 42 closes the first conduit 34, preferably sealingly, between the first location 36b and the second location 38b and thereby prevents direct fluid flow along the first conduit 34 between the first location 36b and the second location 38b. This subsequently forces the oil to divert through one or both of the filter inlet port 38 and the filter outlet port 36, such that when the oil filter 26 is operatively connected to the filter inlet port 38 and the filter outlet port 36, the oil is forced to run through the oil filter 26. Conversely, when the first conduit 34 is not closed by the diverter plug 42 i.e. the diverter plug 42 is not seated in the plug seat 40 or otherwise operatively disposed along the first conduit 34, oil can flow directly along the first conduit 34 between the first port 30 and the second port 32. In this arrangement, the filter inlet and outlet ports 38, 36 are typically plugged off, as discussed below.

The first conduit 34 is arranged such that the diverter plug 42 can be inserted into the plug seat 40 through and along the first conduit 34 from an exterior side of the oil pump plate 10 when operatively connected to a casing, such as to gearbox casing 24. Thus, in the exemplary arrangement, the first conduit 34 is in the form of an axially straight (e.g., linear) bore extending through the oil pump plate 10, at least from a plug access port 44 on and exterior surface on the exterior side of the oil pump plate 10 at one end of the first conduit 34 to the plug seat 40. Further, the first conduit 34 has a first diameter along its length from the plug access port 44 to the plug seat 40 that is larger than an outside diameter of the diverter plug 42 so that the diverter plug 42 can be inserted into the first conduit 34 at the plug access port 44 and moved along the first conduit 34 to the plug seat 40. In this version, the plug seat 40 has a second diameter which is smaller than the first diameter so as to be able to seat the diverter plug 42. In other versions, the first conduit 34 could be uniform in diameter, or tapered in diameter, or otherwise. The plug seat 40 thereby forms a stepped transition in the first conduit 34 at the plug seat 40. Optionally, as shown in the exemplary arrangement of the drawings, the first conduit 34 also extends straight on from the plug seat 40 past the first location 36b to a connecting portion 34a (see, FIG. 5) of the conduit 34, which connects the first conduit 34 to the first port 30. A connecting portion 34b of the conduit 34 similarly connects the first conduit 34 with the second port 32 between the plug access port 44 and the second location 38b. However, the shape of the first conduit 34 is not limited to the particular shape and arrangement shown in the figures, including the particular shapes of the connecting portions 34a and 34b, but rather may take any shape arranged to conduct fluid flow from the first port 30 to the second port 32 through the body of the oil pump plate 10. In some arrangements, the plug access port 44 may be not included, and the diverter plug 42 could be installed and/or removed from the first conduit 34 through either or both of the second port 32 and the first port 30, depending upon the specific shape of the first conduit 34. It is noted that a hole shown at the bottom of the connecting portion 34a (see FIGS. 5 and 6) is provided for machining purposes and is sealed with a plug thereafter in order to prevent leakage of oil through the hole. However, this hole and plug may be dispensed with if a different type of machining and/or forming process is utilized that could allow these parts not to be included.

Each of the plug access port 44, the filter inlet port 38, and the filter outlet port 36 may be selectively opened and/or closed so as to allow or prevent the flow of oil therethrough. Each of the filter inlet port 38, the filter outlet port 36, and the plug access port 44 is located on an exterior side of the oil pump plate 10 in order to provide access thereto when the oil pump plate 10 is operatively mounted to the gearbox casing 24. In the exemplary arrangement, each of the filter outlet port 36, the filter inlet port 38, and the plug access port 44 includes a connector in the form of an internal thread adjacent the exterior surface of the oil pump plate 10. A sealing plug 46 can be selectively inserted or removed from the respective plug access port 44, filter inlet port 38, and/or filter outlet port 36. The sealing plug 46 includes an external thread to mate with the internal thread of the respective ports 44, 38, and/or 36 so as to selectively open or close the respective ports. In this arrangement, any one of the ports 36, 38, 44 may be selectively sealed by screwing one of the sealing plugs 46 into the respective port. Similarly, any one of the ports 36, 38, 44 may be selectively unsealed and opened by unscrewing the respective sealing plug 46 therefrom. However, other mechanisms for selectively opening and or closing the various ports 44, 38, and 36 may be implemented, such those as described elsewhere herein.

In the exemplary arrangement of the figures, each of the first port 30 and the second port 32 is disposed on a face side 48 of the oil pump plate 10; however, other structural arrangements are also possible depending upon the particular arrangement of the machine to which the oil pump plate 10 is to be attached. Preferably, the first port 30 is spaced apart from the second port 32 on the face side 48. The face side 48 is the side of the oil pump plate 10 that mounts against the gearbox casing 24 or other type of casing. The face side 48 preferably forms a sealed connection to the gearbox casing 24. One or more seals, such as O-rings 49 or gaskets, may be provided to enhance the sealed connection around the second port 32 and/or pedestal 58. In contrast, the remaining, exterior surfaces of the oil pump plate 10 are on an exterior side of the oil pump plate that is accessible from an exterior of the gearbox assembly 12 when the oil pump plate 10 is operatively coupled to the gearbox casing 24. The face side 48 preferably includes a mounting face 50, which is adapted to mount directly against a correspondingly shaped mating face 52 of the gearbox casing 24, as best seen in FIGS. 1 and 2. Preferably, each of the mounting face 50 and the mating face 52 is planar; however, the mounting face 50 and the mating face 52 may be non-planar with corresponding shapes so as to facilitate sealing connection between the face side 48 of the oil pump plate 10 and the corresponding mounting region against the gearbox casing 24. In some arrangements the sealing connection may be formed with a seal, such as a gasket, operatively disposed between the mounting face 50 and the mating face 52; however, the sealing connection may be formed without an intervening seal disposed therebetween.

A pump receiver 54 is disposed on the face side of the oil pump plate 10. The pump receiver 54 is for receiving the oil pump 22 in an operative position so as to pump oil into the first port 30. The pump receiver 54 may lockingly engage the oil pump 22, for example with a coupling, such as a pin 56, so as to prevent rotation of at least a portion of the oil pump 22, which in this exemplary arrangement, allows the oil pump 22 to operatively function. However, the pump receiver may receive the oil pump 22 without releasably coupling thereto depending on the type of oil pump being used. In the exemplary arrangement of the drawings, the pump receiver 54 is in the form of a pad that is shaped and sized such that the oil pump 22 rests operatively thereon. The pump receiver 54 is disposed on the top surface of a pedestal 58, which projects upwardly from the mounting face 50. However, inclusion of the pedestal 58 may not be necessary, depending upon the arrangement of the gearbox casing 24. In the exemplary arrangement, the first port 30 is disposed in the top surface of the pump receiver 54 to operatively connect with the oil pump 22. However, other arrangements may be possible depending upon the arrangements of the oil pump 22.

A reservoir 60 is formed in the face side 48 of the oil pump plate 10. The reservoir is disposed adjacent to the pump receiver 54 so as to provide a source of oil to the oil pump 22. In the exemplary arrangement of the drawings, the reservoir 60 is in the form of a channel or recess within the pedestal 58. The channel at least partially surrounds the pump receiver 54. The channel is defined between a peripheral wall 62 extending upwardly from the face side 48 above the mounting face 50 and spaced radially apart from a central portion of the pedestal 58 to form a recessed groove extending partway around the pump receiver 54. A pump inlet 64 is defined in the inner portion of the pedestal to allow oil to pass from the reservoir 60 to the oil pump 22 in order to supply oil to the oil pump from the reservoir. Preferably, the reservoir 60 is arranged so as to collect oil that drains downwardly along a bottom interior floor of the gearbox casing 24 when the oil pump plate 10 is operatively coupled to the gearbox casing 24 as shown in FIGS. 1 and 2. However, inclusion of the reservoir 60 is optional and in some arrangements the reservoir 60 may be omitted. In addition, the reservoir 60 may take other shapes and forms capable of providing a reservoir of oil to be supplied to the oil pump 22.

Figure 5:
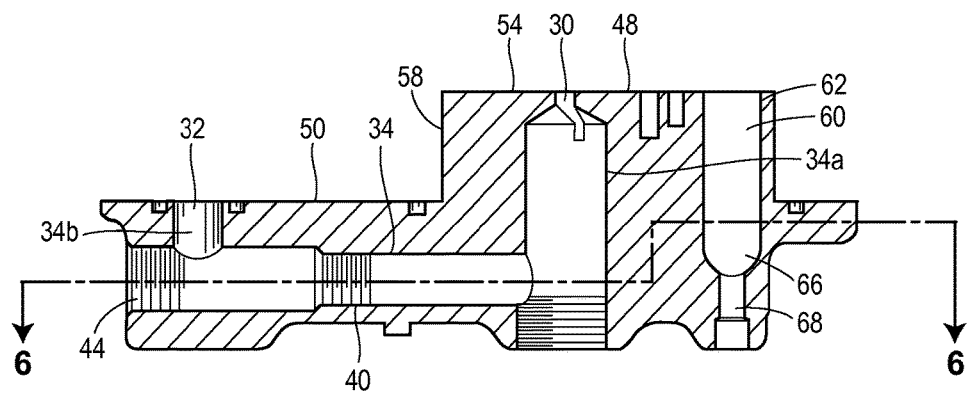
FIG. 5 is a cross-sectional view of the oil pump plate along the line 5-5 of FIG. 4.
Figure 6:
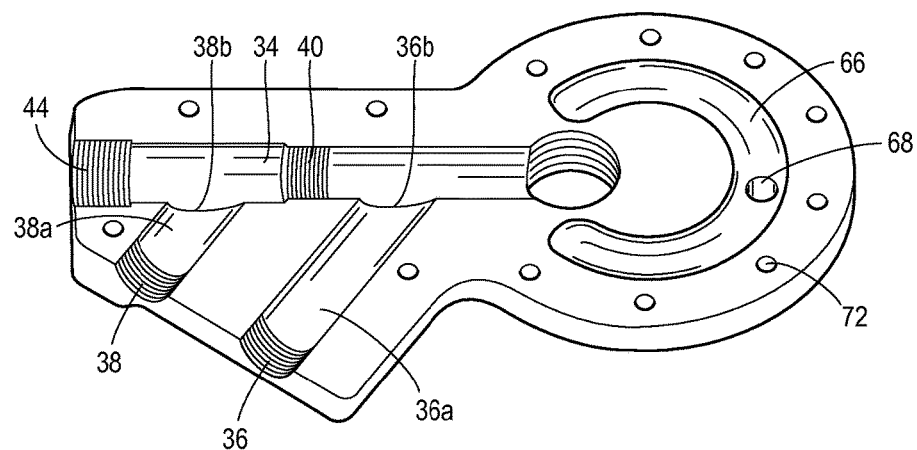
FIG. 6 is a perspective cross sectional view of the oil pump plate along the line 6-6 of FIG. 5.

A collector 66 is optionally formed in the oil pump plate 10 for collecting water and/or sediment from the oil. In the exemplary arrangement of the drawings, the collector 66 is formed as a bottom portion of the reservoir 60 that is disposed below the elevation of the pump inlet 64 when the oil pump plate is operatively connected to the gearbox casing 24. Thus, oil that is collected in the reservoir 60 may have sediment that falls out into the collector 66 and accumulated there over the course of time. The collector 66 includes a collector drain 68 for draining collected sediment, oil, and/or water from the collector 66. As best seen in FIG. 5, the collector drain 68 includes a drain hole extends from a bottom surface of the reservoir 66 to the exterior side of the oil pump plate, preferably in a bottom exterior surface of the oil pump plate 10 when operatively connected to the gearbox casing 24. Further, the collector drain 68 preferably includes a drain plug 70, which can be selectively inserted and/or removed from the drain hole to close or open the drain hole. The drain plug 70 may also be in a similar form as the sealing plugs 46, including for example an exterior thread that meets to a corresponding interior thread in the drain hole. However, other types of drains may be used. Further, the collector 66 in some arrangements may be omitted and/or may be separate from the reservoir 60.

A number of bolt holes 72 preferably extend through the body of the oil pump plate 10 and through the mounting face 50 to facilitate releasably attaching the oil pump plate 10 to a mounting surface, such as the mounting face 52 of the gearbox casing 24. In the present example, the body of the oil pump plate 10 forms a flange structure surrounding the pedestal 58 and an elongate portion extending radially away from the flange structure through which the first conduit 34 extends. The mounting face 50 forms a planar surface extending along the elongate portion and the flange structure. Thus, the oil pump plate 10 can be easily bolted on to or removed from the body of the gearbox casing 24 at a correspondingly shaped mating face 52 with bolts extended through the bolt holes 72. Other suitable fastener arrangements for releasably fastening the oil pump plate 10 to the gearbox casing 24 may be used.

Returning now to FIGS. 1 and 2, it can be seen that the oil pump plate 10 is operatively mounted to the gearbox casing 24 so as to be disposed on a bottom, and preferably lowest point, of the gearbox casing 24. Oil disposed in the gearbox casing 24 for lubricating the various gears and bearings and other features inside the gearbox casing drains down to the reservoir 60. From there, the oil is drawn by the oil pump 22 through the pump inlet 64 and pushed through the first port 30 into and along the first conduit 34 toward the second port 32. The oil is pumped from the second port 32 back into the gearbox casing. Preferably, the second port 32 is operatively connected with an oil galley within the gearbox casing 24; however, the second port 32 may be operatively connected to a different region of the gearbox casing.

In the event that the gear box assembly 12 was not originally installed with the oil filter 26, the oil pump plate 10 facilitates easily retrofitting, i.e. installing, the oil filter 26 such that the oil filter 26 is disposed in-line along the oil flow path from the oil pump 22 to the oil galley or other portions of the gearbox assembly 12. To do this, the sealing plug 46 is removed from the plug access port 44, and the diverter plug 42 is inserted into the first conduit 34 through the plug access port 44. The diverter plug 42 is then pushed or otherwise moved along the first conduit 34 to the plug seat 40. The diverter plug 42 is then secured to the plug seat 40, for example by screwing the exterior threads of the diverter plug 42 into the interior threads of the plug seat 40. The oil filter 26 is operatively coupled to the filter outlet port 36 and the filter inlet port 38, such as with the hoses 28, such that oil can flow from the filter outlet port 36 to the filter 26 and back from the filter 26 to the filter inlet port 38. After the diverter plug 42 has been seated at the plug seat 40, the plug access port 44 is again closed with the sealing plug 46. Thus, an in-line oil filter can be installed into the oil circulation system of the gearbox assembly 12 without having to open the gearbox casing 24 or remove the oil pump plate 10.

In a similar manner, the oil pump plate 10 facilitates easily converting an oil circulation system that has an in-line oil filter already installed to remove the in-line oil filter. To do this, the sealing plug 46 is removed from the plug access 44 to provide access to the diverter plug 42 at the plug seat 40. The diverter plug 42 is then removed from the plug seat 40, for example by unscrewing the diverter plug 42 from the plug seat 40. The diverter plug 42 can then be removed from the first conduit 34 through the plug access port 44, and the plug access port 44 may be re-sealed with the sealing plug 46. With the diverter plug 42 removed from the plug seat 40, the oil filter 26 may be operatively disconnected from the filter outlet port 36 and the filter inlet port 38, for example by removing the hoses 28 from the ports 36, 38. Then, the filter outlet port 36 and the filter inlet port 38 are closed with sealing plugs 46, for example by screwing the exterior threads of the sealing plugs 46 into the corresponding interior threads of the ports 36, 38. After the diverter plug 42 is been removed from the first conduit 34 and the ports 36, 38, and 40 have been re-closed, oil pumped by the oil pump 22 flows from the first port 30 through the first conduit 34 directly to the second port 32 and thus back into the gearbox casing 24 without being diverted through and in-line filter. Thus, an in-line oil filter can also be easily removed from the oil circulation system of the gearbox assembly 12 also without having to open the gearbox casing 24 or remove the oil pump plate 10.

In addition, because the oil pump plate 10 is releasably coupled to the gearbox casing 24, the oil pump 22 may be easily accessed and/or oil may be drained from the gearbox casing 24 by removing the fasteners, such as bolts disposed through the bolt holes 72, and removing the oil pump plate 10 from the gearbox casing 24. The oil pump plate 10 may then also be easily remounted to the gearbox casing 24 by re-coupling the fasteners to the gearbox casing 24.

According to some aspects and arrangements, the oil pump plate 10 may allow for relatively easy field installation and/or removal and/or changing of an oil filter as part of an in-line filter system for an oil pump. According to some aspects and arrangements, the oil pump plate 10 may allow for simpler retrofitting of a gearbox with an in-line oil filter while the gearbox is operatively installed for use in the field (i.e., operatively installed for use with other machines at a particular site, such as with a dry cooling system or a steam condenser). According to some aspects and arrangements, the oil pump plate 10 may allow the use or non-use of an in-line filter with the oil pump to be easily reversible without having to "open up" the gearbox or make substantial alterations to the gearbox.

The exemplary arrangement shown in the drawings and described in detail herein are not intended to be limiting of the invention, but rather a provided as just one example out of many possible arrangements to enable the person of ordinary skill to make and use the invention. Additional arrangements, combinations of features, and/or advantages of the invention are contemplated within the scope of the claims appended hereto.

What is claimed:

1. An oil pump plate for operatively coupling to an oil pump within a casing, the oil pump plate comprising:
    a mounting face disposed on a face side of the oil pump plate, the mounting face arranged to mate to a corresponding mating face of the casing so as to releasably mount the oil pump plate to the casing;
    a first port arranged to operatively connect to an oil pump;
    a second port arranged to operatively connect to an oil containing cavity of the casing;
    a first conduit extending through the oil pump plate from the first port to the second port;
    a filter outlet port operatively connected with the first conduit at a first location along the first conduit;
    a filter inlet port operatively connected with the first conduit at a second location along the first conduit;
    a plug seat disposed along the first conduit between the first location and the second location; and
    a diverter plug that releasably seats at the plug seat to close the first conduit, wherein the diverter plug is sized and shaped to be moved along at least a portion of the first conduit to be selectively inserted into the plug seat and to be selectively removed from the plug seat, and wherein the diverter plug closes the first conduit and prevents direct fluid flow along the first conduit between the first location and the second location when the diverter plug is seated at the plug seat, thereby forcing fluid to divert through at least one of the filter inlet port and the filter outlet port,
    wherein the plug seat comprises an internal thread disposed on an interior surface of the conduit, and
    wherein the diverter plug comprises an external thread that threadedly engages with the internal thread of the plug seat.

2. The oil pump plate of claim 1, further comprising:
    a filter outlet conduit extending from the first conduit at the first location to the filter outlet port; and
    a filter inlet conduit extending from the first conduit at the second location to the filter inlet port.

3. The oil pump plate of claim 1,
    wherein at least one of the first port and the second port is disposed on the face side of the oil pump plate.

4. The oil pump plate of claim 1, further comprising:
    a pump receiver disposed on the face side of the oil pump plate, the pump receiver adapted to operatively receive an oil pump.

5. An oil pump assembly, comprising:
    the oil pump plate of claim 1; and
    an oil pump operatively connected to the first port of the oil pump plate so as to move oil through the first port.

6. A gearbox assembly comprising:
    a gearbox casing;
    an input shaft, an output shaft, and a gear arrangement operatively disposed within the gearbox casing to transfer drive of the input shaft to drive of the output shaft;
    the oil pump plate of claim 1 operatively installed to the gearbox casing; and
    an oil pump disposed inside the gearbox casing and operatively connected to a rotating component of the gearbox assembly and to the first port of the oil pump plate so as to move oil through the first port and to pump lubricating oil to remote locations of the gearbox casing.

7. The gearbox assembly of claim 6, further comprising:
an in-line oil filter operatively coupled to the filter outlet port and the filter inlet port,
wherein the diverter plug is seated at the plug seat.

8. An oil pump plate for operatively coupling to an oil pump within a casing, the oil pump plate: comprising:
a mounting face disposed on a face side of the oil pump plate, the mounting face arranged to mate to a corresponding mating face of the casing so as to releasably mount the oil pump plate to the casing;
a first port arranged to operatively connect to an oil pump;
a second port arranged to operatively connect to an oil containing cavity of the casing;
a first conduit extending through the oil pump plate from the first port to the second port;
a filter outlet port operatively connected with the first conduit at a first location along the first conduit;
a filter inlet port operatively connected with the first conduit at a second location along the first conduit;
a plug seat disposed along the first conduit between the first location and the second location;
a diverter plug that releasably seats at the plug seat to close the first conduit, wherein the diverter plug is sized and shaped to be moved along at least a portion of the first conduit to be selectively inserted into the plug seat and to be selectively removed from the plug seat, and wherein the diverter plug closes the first conduit and prevents direct fluid flow along the first conduit between the first location and the second location when the diverter plug is seated at the plug seat, thereby forcing fluid to divert through at least one of the filter inlet port and the filter outlet port; and
a plug access port disposed at an end of the first conduit, wherein the plug access port is selectively openable and closable, and wherein the plug access port is sized and shaped to receive the diverter plug therethrough for inserting the diverter plug into the first conduit and moving the diverter plug along the first conduit to the plug seat.

9. The oil pump plate of claim 8,
wherein the first conduit has a first cross-sectional size extending between the diverter plug access port and the plug seat, and the first conduit has a second cross-sectional size at the plug access port, and wherein the second cross-sectional size is smaller than the first cross-sectional size.

10. The oil pump plate of claim 9,
wherein the first cross-sectional size is complimentary to and larger than a corresponding cross-sectional size of the diverter plug such that the diverter plug fits within and can be moved along the first conduit from the plug access port to the plug seat.

11. The oil pump plate of claim 8,
wherein each of the filter inlet port, the filter outlet port, and the plug access port is disposed on an exterior surface on an exterior side of the oil pump plate, wherein the exterior side is accessible from an exterior of the casing when the oil pump plate is operatively attached to a casing.

12. An oil pump plate for operatively coupling to an oil pump within a casing, the oil pump plate: comprising:
a mounting face disposed on a face side of the oil pump plate, the mounting face arranged to mate to a corresponding mating face of the casing so as to releasably mount the oil pump plate to the casing;
a first port arranged to operatively connect to an oil pump;
a second port arranged to operatively connect to an oil containing cavity of the casing;
a first conduit extending through the oil pump plate from the first port to the second port;
a filter outlet port operatively connected with the first conduit at a first location along the first conduit;
a filter inlet port operatively connected with the first conduit at a second location along the first conduit;
a plug seat disposed along the first conduit between the first location and the second location;
a diverter plug that releasably seats at the plug seat to close the first conduit, wherein the diverter plug is sized and shaped to be moved along at least a portion of the first conduit to be selectively inserted into the plug seat and to be selectively removed from the plug seat, and wherein the diverter plug closes the first conduit and prevents direct fluid flow along the first conduit between the first location and the second location when the diverter plug is seated at the plug seat, thereby forcing fluid to divert through at least one of the filter inlet port and the filter outlet port; and
a reservoir disposed on the face side of the oil pump plate, the reservoir adapted to collect fluids for supply to an oil pump operatively coupled with the oil pump plate.

13. An oil pump plate for operatively coupling to an oil pump within a casing, the oil pump plate: comprising:
a mounting face disposed on a face side of the oil pump plate, the mounting face arranged to mate to a corresponding mating face of the casing so as to releasably mount the oil pump plate to the casing;
a first port arranged to operatively connect to an oil pump;
a second port arranged to operatively connect to an oil containing cavity of the casing;
a first conduit extending through the oil pump plate from the first port to the second port;
a filter outlet port operatively connected with the first conduit at a first location along the first conduit;
a filter inlet port operatively connected with the first conduit at a second location along the first conduit;
a plug seat disposed along the first conduit between the first location and the second location;
a diverter plug that releasably seats at the plug seat to close the first conduit, wherein the diverter plug is sized and shaped to be moved along at least a portion of the first conduit to be selectively inserted into the plug seat and to be selectively removed from the plug seat, and wherein the diverter plug closes the first conduit and prevents direct fluid flow along the first conduit between the first location and the second location when the diverter plug is seated at the plug seat, thereby forcing fluid to divert through at least one of the filter inlet port and the filter outlet port; and
a collector formed on the oil pump plate, the collector arranged to collect sediment from the oil.

\* \* \* \* \*